April 3, 1956  E. J. EHINGER  2,740,196
CUTTING TOOL FOR WIRE AND THE LIKE
Filed June 16, 1954

INVENTOR.
EDWARD JOHN EHINGER
BY
Albert Jacobs
ATTORNEY.

United States Patent Office 2,740,196
Patented Apr. 3, 1956

2,740,196
CUTTING TOOL FOR WIRE AND THE LIKE

Edward John Ehinger, Philadelphia, Pa.

Application June 16, 1954, Serial No. 437,141

1 Claim. (Cl. 30—186)

The present invention relates to a cutting tool or implement and more particularly to a cutting tool for wire.

It is well known that in using conventional cutting tools or wire cutters there is a disadvantage in manipulating the same due to the fact that the handles or gripping portions thereof have to be manually separated or opened before hand pressure is again applied for cutting purposes after the wire is inserted between the cutting jaws. Due to the fact that wire cutters are ordinarily operated with one hand, this has proved to be inconvenient and disadvantageous. The present invention, therefore, relates to a simple, practical and inexpensive solution to that porblem.

One of the objects of the invention is to provide a cutting tool for wire or other like material in which, after each cutting operation, the handles or gripping portions thereof automatically open upon the release of hand pressure so that the tool is then ready for its next cutting operation.

Another object of the invention resides in the provision of a simple automatically-operating opening device secured to the inner surface of one of the handles or gripping portions and acting upon the other thereof so that, upon the release of manual pressure necessary for cutting, the jaws of the tool open automatically for the next cutting operation, being normally urged toward such position.

Other and further objects and advantages will be understood and appreciated by those skilled in this art or will be apparent or pointed out hereinafter.

In the accompanying drawing.

Figure 1:
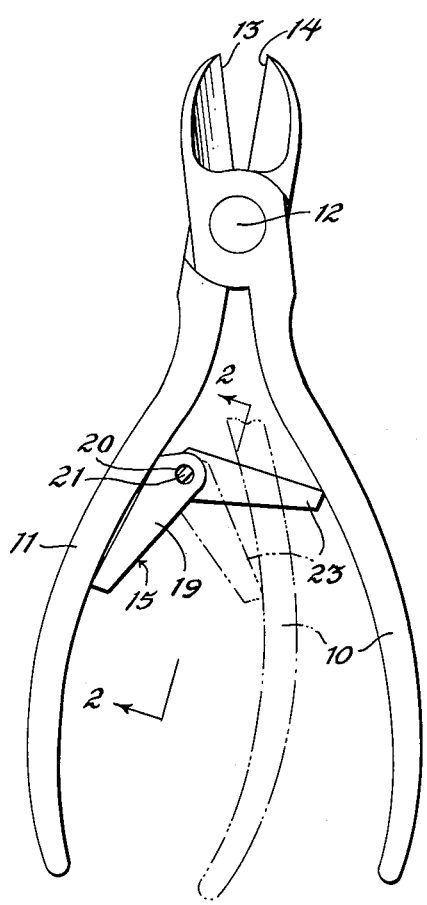
Fig. 1 illustrates, in side elevational view, a cutting tool responding to the invention.

Referring now to the drawing in detail, the handle or gripping portions of the new cutting tool are designated by the numerals 10 and 11, such portions being of arcuate shape and pivoted at their upper ends at 12, terminating in the cutting or jaw portions 13 and 14. The entire cutting tool may be made of any suitable material, such as forged steel, and the jaws 13 and 14 constituting extensions of the gripping portions 10 and 11, respectively, may be ground, shaped, cast or otherwise formed so as to provide sharp, strong cutting edges. The cutting tool, as so far described, is of standard or conventional design and construction and may take other specific forms than that illustrated.

Figure 2:
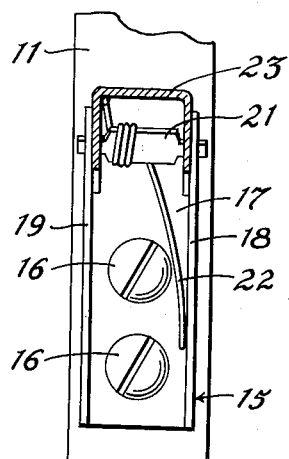
Fig. 2 is a fragmentary elevational view, partly in section, taken along line 2—2 of Fig. 1.

On the inner surface of either of the portions 10 or 11, preferably but not necessarily on the inner surface of the portion 11 as illustrated, a small U-shaped metallic housing 15 is secured as by means of the machine screws 16 or other suitable fastening instrumentalities. Housing 15 is made up of a base portion 17 which lies against the inner surface of the gripping portion 11 and has a pair of side flanges 18 and 19 which rise perpendicularly therefrom to provide the U-shaped housing aforesaid. The flanges 18 and 19 are each provided adjacent its upper end with an opening 20, the said openings being in transverse alignment and disposed therein and projecting somewhat therethrough is the shaft member 21 which is flat and of rectangular cross-section but materially wider at that portion between the flanges, as will be clearly apparent from Fig. 2 so as to provide a form on which the spring wire 22 is wound, the said spring wire having several turns around the central widened portion of the shaft 21 and one relatively long extending end thereof projecting downwardly into contact with the U-shaped housing 15 to provide a seat or purchase for spring action. The other end of spring 22 projects upwardly and is relatively short, terminating within the U-shaped extension 23, the side portions of which are apertured for the passage therethrough of the reduced outer ends of the shaft 21. The U-shaped extension 23 is therefore pivotable with respect to housing 15 and the limits of movement thereof will be apparent from Fig. 1, wherein the full line position of member 23 represents the normal position when the cutting tool is not in use or after manual gripping pressure has been released so as to open the jaws 13, 14 and the dotted line position thereof indicating the position of this member when gripping pressure has been applied to portions 10 and 11 for cutting purposes, at which time the portions 10 and 11 approach each other, as will be understood from the dotted line position of portion 10 shown in Fig. 1.

Thus, it will be clear that, when the cutting tool or implement is not in use, or when a cutting operation has been completed and the manual gripping force released, the jaws 13, 14 are open ready for the reception of a wire or other material to be cut and the gripping portions 10 and 11 are in their most widely separated positions. After a wire or other material is inserted between the jaws 13, 14 or the tool applied to a wire or other material to be cut, compressive manual force is exerted by the hand of the user upon portions 10 and 11, thereby bringing them into their most closely associated positions. During this time the member 23 gradually moves from its full-line position to its dotted line position of Fig. 1 and, when the compressive manual gripping force is released after cutting is accomplished, the member 23 automatically swings from dotted line position to full line position separating the portions 10 and 11 to their maximum extent and maintaining them in such separated condition with the jaws of the tool open ready for use. It will be appreciated that this action is accomplished by means of the housing 15, member 23, shaft 21 and spring 22 so that the handles or gripping portions of the tool are normally urged to their most separated positions, thus normally maintaining jaws 13 and 14 open. This eliminates the necessity for pulling the portions 10 and 11 apart after the cutting operation with a standard or conventional construction of tool, and thus offers important advantages and utility in connection with cutting operations and the use of the tool in relatively inaccessible locations. The described construction also makes it possible to carry out a series of cutting operations on a plurality of wires or other filamentary or like material in an expeditious and facile manner without modifying the basic form of the tool itself. It will further be noted that an additional advantage of the present invention is that the opening device can be applied to existing tools and, therefore, does not require any modification of the machinery or equipment used for making the cutting tool.

The foregoing is presented as illustrative and not as limitative since within the terms of the appended claim variations and modifications may be made without departing from the invention.

I claim:

A wire cutting tool having movable handle portions pivoted together and terminating in cutting jaws, one of the handle portions thereof being provided on its inner surface with an opening attachment normally urging the handle portions of said tool to their fully separated position, the said opening attachment comprising a flanged housing secured along the inner surface of one of said handle portions within the plane thereof, an extension member pivotally connected to said housing and making point contact with the inner surface of the other of said handle portions, a shaft extending through said housing and extension and a spring wire partially wound upon said shaft having one end seated against said housing and the other end seated against said extension and the said shaft being flat and of rectangular cross-section with its intermediate portion being wider than the shaft ends.

References Cited in the file of this patent

UNITED STATES PATENTS

| | | |
|---|---|---|
| 662,468 | Scheerer | Nov. 27, 1900 |
| 2,046,642 | Lynch | July 7, 1936 |
| 2,676,404 | Peckron et al. | Apr. 27, 1954 |